Patented Sept. 23, 1952

2,611,786

UNITED STATES PATENT OFFICE 2,611,786

3-CARBOXYLIC ACYLAMINO-2,4,6-TRIIODO BENZOIC ACIDS AND THE ETHYL ESTER AND NONTOXIC SALTS

Vernon H. Wallingford, Ferguson, Mo., assignor to Mallinckrodt Chemical Works, St. Louis, Mo., a corporation of Missouri No Drawing. Application May 31, 1950, Serial No. 165,355

11 Claims. (Cl. 260—518)

This invention relates to halogenated compounds and more particularly to novel 3-acylamino-2,4,6-triiodobenzoic acids and their salts and esters.

This application is a continuation-in-part of my copending U. S. patent application, Serial No. 40,000, filed July 21, 1948.

Among the objects of this invention are the provision of new derivatives of benzoic acid which contain a plurality of iodine atoms; the provision of compounds of the type indicated which are useful intermediates for the preparation of other compounds of related structure; the provision of compounds of the type referred to which possess relatively low toxicity toward human beings; the provision of compounds of the type referred to which possess substantial solubility in water; the provision of improved contrast media for X-ray diagnosis; the provision of improved X-ray contrast agents for urography or cholecystography; and the provision of compounds which are relatively stable under normal conditions of storage and use and in the presence of body fluids. Other features will be in part apparent and in part pointed out hereinafter.

The invention accordingly comprises the ingredients and combinations of ingredients, the proportions thereof, and features of composition which will be exemplified in the products hereinafter described, and the scope of the application of which will be indicated in the following claims.

According to the present invention it has been found that aliphatic acylated 3-amino-2,4,6-triiodobenzoic acids possess many unexpected and valuable properties. These compounds consist of the acids of the general formula:

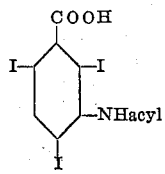

together with their salts and esters.

The compounds of this invention are of especial value as X-ray contrast agents, for which purpose many of them are preeminently suited. Some members of the series when injected intravenously in the form of a solution of one of their soluble pharmacologically acceptable salts, are rapidly concentrated in the kidneys and excreted in the urine, and when administered orally, are absorbed only slowly if at all from the gastrointestinal tract. Depending upon mode of administration, they may be used for visualization of the urinary system or the gastrointestinal tract.

Others of these compounds are concentrated within the gall bladder, thereby rendering it opaque to X-rays. Even though some of these compounds are more toxic than those used for urography, it has been found, nevertheless, that they are less toxic than other media in general use for visualization of the gall bladder. Thus as the properties change, the field of usefulness also changes.

The compounds of this invention may be prepared from 3-amino-2,4,6-triiodobenzoic acid by the methods customarily employed for acylating amine groups. The reaction medium may be either an excess of the acylating agent, or some other solvent may be employed. Dioxane has been found to be a particularly suitable solvent for many of these reactions. When the acylating agent is an acid or acid anhydride, the yield and purity of the product may often be improved by adding a trace of sulfuric acid as a catalyst to the reaction mixture. While not always essential, the addition of a catalyst appears to be beneficial in all such cases. The salts and esters of these compounds are prepared by the usual methods employed in preparing the salts and esters of organic acids.

It has been found that many of the compounds of this invention may advantageously be purified by heating them with an acid anhydride such as acetic anhydride to form new anhydrides which crystallize easily from acetic anhydride. Hydrolysis of the purified anhydride then gives the corresponding acid in pure form. Instead of acetic anhydride, which is preferred because of its relative economy and availability, other lower aliphatic anhydrides may be employed.

The following examples illustrate the invention:

EXAMPLE 1

*3-formylamino-2,4,6-triiodobenzoic acid*

A mixture of 60 g. of 3-amino-2,4,6-triiodobenzoic acid [H Kretzer, Berichte, 30, 1944 (1897); Beilstein 14, p. 414] with 300 ml. of formic acid (87%) containing 6 drops of concentrated sulfuric acid was stirred and heated at 100–104° C. After thirty minutes approximately one-half of the original solid had dissolved and a solid of different appearance started to come out of solution, eventually nearly filling the liquid. An additional 50 ml. of formic acid was added at this stage and heating was continued for a total of 1¾ hours. The resulting mixture was poured into 1200 ml. of water and the solid was filtered off and washed with water. After drying overnight at 95° C. the product weighed 53.3 g. and melted with decomposition at 140–141° C. The product was recrystallized by dissolving one part in a mixture of six parts of glacial acetic acid and four parts of dioxane, heating to 80° C. and then cooling to room temperature. The purified 3-formylamino-2,4,6-triiodobenzoic acid melted with decomposition at 250.8–251.2° C. The equivalent weight was determined to be 540 (theory 542.7) by titrating with standard alkali, using phenolphthalein as an indicator.

EXAMPLE 2

3-acetylamino-2,4,6-triiodobenzoic acid 3-amino-2,4,6-triiodobenzoic acid (51.5 g.) was mixed with 125 ml. of acetic anhydride containing 2 drops of concentrated sulfuric acid and refluxed for thirty minutes. The mixture was allowed to cool slightly, and then was poured into 600 ml. of water at room temperature and stirred until crystallization was complete. The mixed anhydride of 3-acetylamino-2,4,6-triiodobenzoic acid with acetic acid thus prepared was then separated by filtration and washed with water. Without drying, the solid was suspended in 600 ml. of water and hydrolyzed with a slight excess of ammonium hydroxide. It was necessary to warm the mixture slightly and stir it for about one-half hour in order to dissolve all the solid. The solution was then treated with activated carbon, filtered and precipitated with an excess of hydrochloric acid, filtered, washed and dried at 70° C. The yield was 51.5 g. of 3-acetylamino-2,4,6-triiodobenzoic acid which melted at 276.6–278.2° C. with decomposition when placed in the melting block at 260° C. and heated at the rate of 3° C. per minute. Due to decomposition, the melting point varies from about 269–280° C., depending upon the rate of heating and other conditions. The equivalent weight was 565 (theory 557). Analysis showed: 19.77, 19.60% carbon; 1.59, 1.42% hydrogen. Calculated for $C_9H_6O_3NI_3$: 19.4% carbon; 1.08% hydrogen.

EXAMPLE 3

3-acetylamino-2,4,6-triiodobenzoic acid 3-amino-2,4,6-triiodobenzoic acid (103 g.) was acetylated by heating it with 250 ml. of acetic anhydride containing 4 drops of concentrated sulfuric acid as in Example 2 except that after refluxing was completed the solution was left to stand overnight. By the following morning a white solid separated in the form of grape-like clusters which did not redissolve even though refluxed for more than two hours. This material was the mixed anhydride of acetic acid and 3-acetylamino-2,4,6-triiodobenzoic acid. The solid was collected on a filter, washed with acetic anhydride and dissolved in 1200 ml. of water with ammonium hydroxide. This solution was then made acid to litmus with acetic acid, bleached with 10 g. of sodium bisulfite, treated with 10 g. of activated carbon and filtered. A gleaming, chalk-white solid was obtained by adding 1:2 diluted hydrochloric acid to the stirred, hot (55–65° C.) solution. The 3-acetylamino-2,4,6-triiodobenzoic acid was washed, and dried at 70° C. The yield was 92.9 g. (83% of theory) of a product which melted with decomposition beginning at 269° C. when placed in the melting point apparatus at 260° C. An additional 0.8 g. of product which melted at 268.5° C. was obtained by hydrolyzing the acetic anhydride mother liquor.

EXAMPLE 4

Sodium salt of 3-acetylamino-2,4,6-triiodobenzoic acid 3-acetylamino-2,4,6-triiodobenzoic acid (28 g.) was dissolved in a little over 50 ml. of 1 N sodium hydroxide in a round-bottom flask. The pH was adjusted to slightly over 7 and the solution was evaporated on a steam bath under reduced pressure. After the residue became solid, it was further dried overnight in a vacuum desiccator containing calcium chloride. The salt weighed 31.2 g., theory being 29.0 g., indicating that the product contains about 7% water of crystallization when dried under these conditions. The finished salt was scraped from the flask and ground.

10.0 g. of the anhydrous sodium salt are soluble in 11.5 ml. of water at 25° C.

The sodium salt of 3-acetylamino-2,4,6-triiodobenzoic acid when injected intravenously as an aqueous solution is rapidly concentrated in the kidneys and excreted in the urine and when administered orally is absorbed only slowly if at all from the gastrointestinal tract. Depending upon the mode of administration, it may be used for visualization of the kidneys, ureters, bladder, upper gastrointestinal tract or lower gastrointestinal tract.

EXAMPLE 5

3-propionylamino-2,4,6-triiodobenzoic acid

A suspension of 50.0 g. of 3-amino-2,4,6-triiodobenzoic acid in 150 ml. of propionic anhydride containing 3 drops of concentrated sulfuric acid was slowly heated with good mechanical stirring. When the temperature reached 120–125° C. the material began to dissolve and a clear, amber-colored solution was obtained. This temperature was maintained for about one hour, and then the solution was allowed to cool. The reaction mixture was poured onto 500 ml. of water and sufficient ammonium hydroxide was added to make the solution basic. The mixture was stirred well until substantially all of the material had dissolved. It was then filtered and diluted to about 1000 ml. and acidified with concentrated hydrochloric acid. The precipitation was repeated. An 87% yield was obtained at this point.

Further purification was obtained through the ammonium salt. The free acid was dissolved in ten times its weight of water and sufficient ammonia to make the solution basic. The addition of 10% of the total weight of ammonium chloride precipitated the ammonium salt. This was filtered off, dissolved in about twenty times its weight of water, and filtered. The addition of concentrated hydrochloric acid precipitated the free acid. The acid was filtered off, washed well with water and dried in the air.

Anal. calcd. for $C_{10}H_8O_3NI_3$: I, 66.7; neut. equiv., 570.7. Found: I, 66.9; neut. equiv., 571.

EXAMPLE 6

3-butyrylamino-2,4,6-triiodobenzoic acid

A mixture of 12.9 g. of 3-amino-2,4,6-triiodobenzoic acid, 25 ml. of n-butyric anhydride, 25 ml. dioxane and one drop of concentrated sulfuric acid, was refluxed for one-half hour and allowed to stand. After three days no crystals had formed. It was poured into 150 ml. of water and stirred one-half hour to hydrolyze the excess n-butyric anhydride. The water layer was decanted from the brown oily layer (the anhydride of 3-butyrylamino-2,4,6-triiodobenzoic acid with n-butyric acid) and the latter was washed again with an equal volume of water and decanted. Two hundred ml. more water were added, stirred and the oily layer dissolved using ammonium hydroxide. After making the solution acid to litmus with acetic acid, it was treated with activated carbon and filtered. The solution was still brown. While heating at 70–80° C., 10% hydrochloric acid was added dropwise with stirring. A white precipitate formed, redissolved, then came out as a brown oil. The following morning it was taffy-like. The liquid was poured off, replaced by 200 ml. of water and the taffy dissolved with ammonium hydroxide. After warming to 55° C., precipitation was again attempted with 10% hydrochloric acid. The oil reappeared. After adding 5 ml. of acetic acid, one gram of sodium bisulfite and about 34 ml. of anhydrous denatured alcohol to the oily mixture, the resulting solution was treated with activated carbon and filtered. A very light brown solution resulted which was stirred and cooled to 20° C. by adding ice, then precipitated very slowly with 3% hydrochloric acid. A light solid first separated which finally crystallized to a yellow-white solid of a fine sandy consistency. It was dried overnight in a vacuum desiccator. The product weighed 9.7 g. (66% of theory) and melted at 248° C. with decomposition. Found on analysis: 22.57, 22.72% carbon; 2.02, 2.01% hydrogen. Calculated for $C_{11}H_{10}O_3NI_3$: 22.57% carbon; 1.72% hydrogen.

EXAMPLE 7

3-caproylamino-2,4,6-triiodobenzoic acid

A suspension of 103.0 g. of 3-amino-2,4,6-triiodobenzoic acid in 1100 ml. of boiling toluene was prepared in a two liter flask equipped with stirrer and condenser, and a portion of the toluene (250 ml.) was distilled off to remove any water. The condenser was then set for reflux and 40 ml. of caproyl chloride was added. In twelve minutes the solution was almost clear, but within the next three minutes a heavy precipitate formed which filled the liquid in the flask. Refluxing was continued for forty-five minutes. At the end of that time, the mixture was too thick to stir. It was allowed to cool and then filtered.

The solid material was partially dissolved in 400 ml. of water and sufficient sodium hydroxide was added to make the mixture basic. The mixture was transferred to a separatory funnel and solution completed by adding a small amount of ether. The two layers were separated, the alkaline solution was again washed with ether, then filtered and heated on the steam bath to remove the ether. It was diluted to 1500 ml. and acidified with hydrochloric acid. The 3-caproylamino-2,4,6-triiodobenzoic acid material which precipitated was filtered, washed well with water and dried in the air.

One hundred and six grams of 3-caproylamino-2,4,6-triiodobenzoic acid was recovered, representing a yield of 87%. The neutral equivalent was 610. (Theory: 613.)

The reaction product was further purified by dissolving the acid in ten times its weight of water and sufficient ammonium hydroxide to make the solution basic. The ammonium salt was salted out by the addition of ammonium chloride in the amount of 10% of the total weight of solution. The solution was filtered and the ammonium salt dissolved in forty times its weight of water. The ammoniacal solution was acidified with concentrated hydrochloric acid and the purified product recovered by filtration.

Anal. calculated for $C_{13}H_{14}O_3NI_3$: C, 25.5; H, 2.3; I, 62.1 Found: C, 25.6; H, 2.4; I, 62.5.

The sodium salt of 3-capyroylamino-2,4,6-triiodobenzoic acid when administered intravenously as an aqueous solution is concentrated in the bile rendering the gall bladder opaque to X-rays.

EXAMPLE 8

Ethyl 3-acetylamino-2,4,6-triiodobenzoate

One hundred grams of 3-acetylamino-2,4,6-triiodobenzoic acid was mixed with 200 ml. of anhydrous ethyl alcohol in a flask arranged with condenser for refluxing. To the mixture was added sodium ethylate prepared by dissolving 4.15 grams of sodium metal in 100 ml. of anhydrous ethyl alcohol. After adding 400 grams of diethyl sulfate, the mixture was refluxed for eighteen hours. It was then poured into 1800 ml. of water and sodium bicarbonate was added until the mixture was no longer acid to litmus paper. The solid ester was filtered off, washed with water and dried at 100° C. The mother liquor, when acidified with Congo red with hydrochloric acid, yielded 22.3 grams of recovered 3-acetylamino-2,4,6 - triiodobenzoic acid. The dried ethyl 3 - acetylamino - 2,4,6 - triiodobenzoate weighed 78.1 grams which is a 97% yield based upon the starting material actually consumed. The product was recrystallized from 50% ethyl alcohol by volume, using about 100 ml. for 5 grams. After two crystallizations it melted at 207.2–208.0° C.

Anal. calcd. for $C_{11}H_{10}O_3NI_3$: C, 22.6; H, 1.7; I, 65.2. Found: C, 22.7; H, 1.9; I, 64.5.

Some of the many surprising and valuable properties possessed by the compounds of the present invention are revealed in the following table:

| Acid | Solubility of Sodium Salt g./100 ml. water | L. D. 50 (Mice) mg./kilo body weight |
|---|---|---|
| 3-amino-2,4,6-triiodobenzoic acid | 9.3 | 1,250 |
| 3-formylamino-2,4,6-triiodobenzoic acid | 71 | 8,000 |
| 3-acetylamino-2,4,6-triiodobenzoic acid | 94 | 10,700 |
| 3-propionylamino-2,4,6-triiodobenzoic acid | 37 | 8,100 |
| 3-butyrylamino-2,4,6-triiodobenzoic acid | 60 | 4,800 |
| 3-caproylamino-2,4,6-triiodobenzoic acid | 78 | 1,450 |

The L. D. 50 value is the dosage necessary to kill 50% of the test animals when the compound is injected intravenously as a solution of its sodium salt.

Not only does acrylation in most cases increase the solubility and the tolerated doses many times relative to 3-amino-2,4,6-triiodobenzoic acid, but the compounds of this invention compare favorably in these respects with commonly employed but structurally dissimilar compounds containing substantially less iodine in their molecules.

The high solubility and low toxicity of these new compounds is unexpected, not only in view of the properties of the corresponding unacylated compounds but also because of the high proportion of iodine which they contain. The compounds of this invention may contain as much as 68% iodine. Heretofore, it has been accepted that in general the toxicity is directly related and the solubility inversely related to the proportion of iodine which is attached to an organic molecule. The solubility and toxicity relations of these compounds are exactly the opposite of what one would expect on the basis of a study of the art.

It is not intended that the compounds of this invention be limited to urographic or cholecystographic media, as the properties of these compounds make them useful for many other purposes. They may, for example, be administered orally in the form of solutions, suspensions, capsules, tablets, etc., for visualization of the gastrointestinal tract. In such cases it is not even essential that soluble salts be employed. In some cases it is desirable to employ an oil or other organic diluent as a medium, in which cases the solubility characteristics of the esters are desirable. Moreover, the usefulness of these compounds is not confined to visualization of human organs, since they are equally useful for X-ray visualization of other structures which cannot conveniently be viewed directly. In addition, the acrylamino benzoic acids of this invention may be used in the preparation of other iodinated derivatives useful per se or as further intermediates.

In view of the above, it will be seen that the several objects of the invention are achieved and other advantageous results attained.

As many changes could be made in the above products without departing from the scope of the invention, it is intended that all matter contained in the above description shall be interpreted as illustrative and not in a limiting sense.

I claim:

1. A compound selected from the group consisting of a 3-acylamino-2,4,6-triiodobenzoic acid of the general formula:

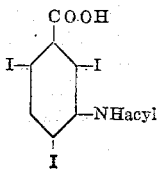

where acyl represents a lower aliphatic carboxylic acyl radical, and the ethyl ester and non-toxic salts thereof.

2. An aliphatic 3-acylamino-2,4,6-triiodobenzoic acid of the general formula:

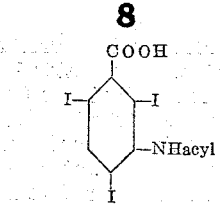

where acyl represents a lower aliphatic carboxylic acyl radical, and in which the acyl group contains at least two carbon atoms.

3. An aliphatic 3-acylamino-2,4,6-triiodobenzoic acid of the general formula:

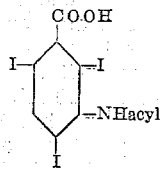

where acyl represents a lower aliphatic carboxylic acyl radical.

4. A non-toxic salt of an aliphatic 3-acylamino-2,4,6-triiodobenzoic acid of the general formula:

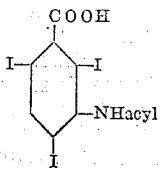

where acyl represents a lower aliphatic carboxylic acyl radical.

5. 3-Acetylamino-2,4,6-triiodobenzoic acid.
6. 3-propionylamino-2,4,6-triiodobenzoic acid.
7. 3-butyrylamino-2,4,6-triiodobenzoic acid.
8. The non-toxic salts of 3-acetylamino-2,4,6-triiodobenzoic acid.
9. The non-toxic salts of 3-propionylamino-2,4,6-triiodobenzoic acid.
10. Sodium 3 - acetylamino - 2,4,6 - triiodobenzoate.
11. Sodium 3-propionylamino - 2,4,6 - triiodobenzoate.

VERNON H. WALLINGFORD.

REFERENCES CITED

The following references are of record in the file of this patent:

Wheeler et al., Am. Chem. J., 42, 454 (1909).
Kretzer, Berichte Deut. Chem. 30, 1944 (1897).
Goldberg et al., Chem. Abst., vol. 41, col. 4131 (1947).